Sept. 1, 1925.
H. E. DECKEBACH
1,551,979
PROCESS AND APPARATUS FOR MAKING BEER OF LOW ALCOHOLIC CONTENT
Filed Sept. 20, 1919
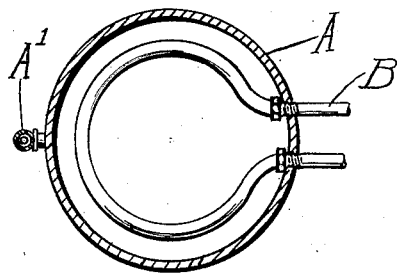
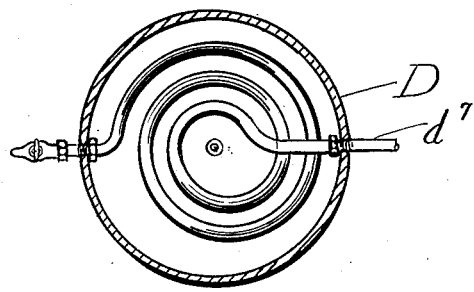
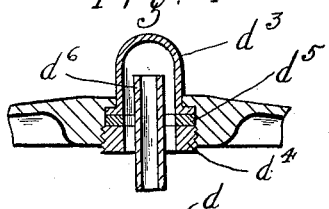
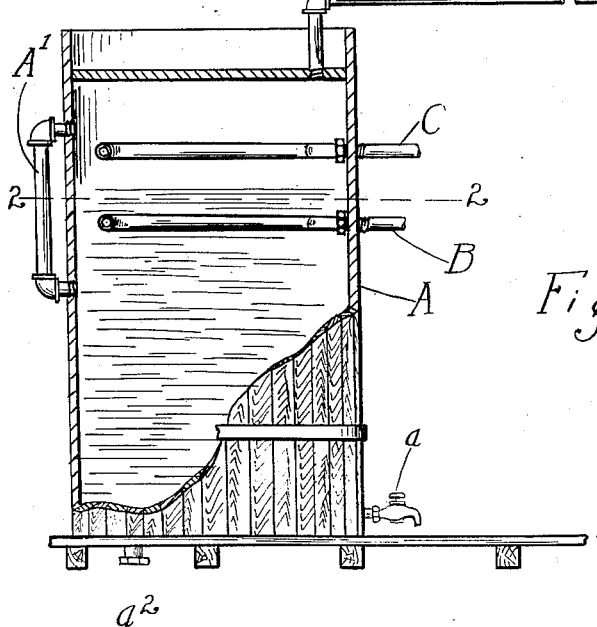
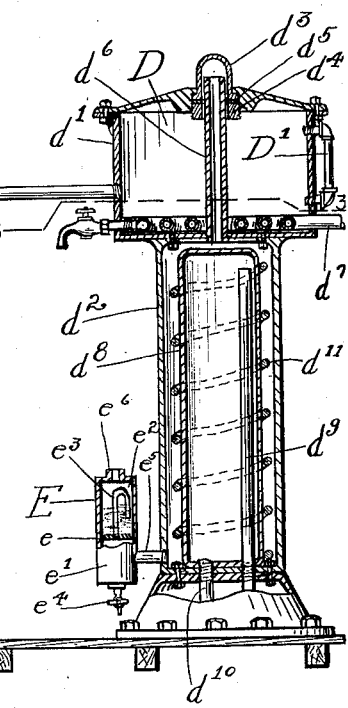
INVENTOR
Henry E. Deckebach
Walter H. Murray
ATTORNEY Patented Sept. 1, 1925.

1,551,979

UNITED STATES PATENT OFFICE.

HENRY E. DECKEBACH, OF CINCINNATI, OHIO.

PROCESS AND APPARATUS FOR MAKING BEER OF LOW ALCOHOLIC CONTENT.

Application filed September 20, 1919. Serial No. 325,141.

*To all whom it may concern:*

Be it known that I, HENRY E. DECKEBACH, a citizen of the United States of America, and a resident of Cincinnati, in the county of Hamilton and State of Ohio, have invented a new and useful Improvement in Processes and Apparatus for Making Beer of Low Alcoholic Content, of which the following is a specification.

An object of my invention is a means for removing alcohol from beer, without deleteriously affecting the taste thereof, and for recovering the alcohol that is removed.

In the accompanying drawing, in which I have illustrated an apparatus embodying my invention and by means of which I carry out my process:—

Fig. 1 is a view in longitudinal section and partly in side elevation of a fermenting tub and an alcohol condenser embodying my invention.

Fig. 2, is a sectional view upon line 2—2 of Fig. 1.

Fig. 3, is a sectional view upon line 3—3 of Fig. 1.

Fig. 4, is an enlarged detail sectional view of the sight cup and the pipe in the upper part of the condenser.

The apparatus embodying my invention comprises a fermenting tub A, near the top of which is a cooling coil B and a heating coil C, and a condenser D which is connected to the fermenting tub by a pipe $d$. Tub A has near its bottom an outlet faucet $a$ and in its bottom a drain $a^2$.

The condenser comprises a receiving drum $d'$, a column $d^2$ and their accessories now to be described. In the top of the receiving drum $d'$ is a glass observing cup $d^3$ which is held in a screw-threaded bore in the top of the cover by means of a nut and a washer $d^4$, $d^5$ respectively. A pipe $d^6$ projects thru the bottom of the drum into the top of the column $d^2$ and at its upper end enters the observing cup $d^3$ between which and the pipe is left an annular space for the flow of vapors from the drum into the pipe $d^6$ and thence into the column $d^2$. In the bottom of the drum $d'$ is located a coil $d^7$, which may be used either as a cooling or as a heating coil. Within the center of the column $d^2$ I have located a brine tank $d^8$, around which is coiled a wire or strip $d^{11}$ to break the flow of vapors and liquid, within which tank is an exit pipe $d^9$ which extends thru the bottom to a point adjacent the top thereof, and entrance pipe $d^{10}$ which extends thru the bottom of the tank. Upon the side of the column and near the bottom thereof, I locate a gas separator E which is divided by a central diaphragm $e$ into a lower chamber $e'$ and an upper chamber $e^2$. Thru the diaphragm projects a goose-neck $e^3$. In the bottom of chamber $e'$ is a discharge tube $e^4$. Upon the sides of the fermenting tub and of the drum, are suitable gauges A' and D' respectively.

It will be observed that the spaces above the beer in tub A and within the condenser D are closed and communicate with one another by way of the pipe $d$, and that condensation in the condenser tends to produce a vacuum in the tub.

In carrying out my process, beer, that has passed thru the usual processes of brewing is brought to the fermenting tub A at about a temperature of 42 degrees Fahrenheit, where it receives its yeast in the usual way. Then the fermentation is permitted to proceed until the beer has reached approximately a temperature of 48 degrees Fahrenheit. I then introduce brine, at about a temperature of 48 degrees Fahrenheit, into the coil B and introduce water of a temperature from 80 degrees Fahrenheit to 125 degrees Fahrenheit into the coil C. The flow of the brine thru its coil B, and of the hot water thru its coil C is continued until the alcohol in the beer has been reduced to the percentage desired. The cooperation of the hot water in the coil C disposed above the body of the beer and of the brine in coil B will cause an evaporation of alcohol to take place from the surface beer without causing the temperature of the body thereof to rise to any appreciable degree above 48 degrees Fahrenheit. Thus the evaporation of the alcohol is obtained without subjecting the body of the beer to any temperatures which would deleteriously affect its taste.

The vapors of alcohol rising from the surface of the tank would flow thru the pipe $d$ into the receiving drum D, as would also carbonic acid gas which arose from the surface of the beer. In the receiving drum D the alcohol vapors would come into contact with the cooling coil $d^7$ thru which a circulation of cold brine would be maintained. If any foam or liquid should pass thru tube $d$, a heating fluid may be passed thru coil $d^7$, to vaporize it. The vapors in the drum, would flow thru pipe $d^6$ into the top of the observation cup $d^3$ and would thence descend thru the interior of the pipe $d^6$ in the column $d^2$, being discharged upon the top of the brine tank $d^8$ thru which a circulation of cold brine would be maintained by means of the pipes $d^9$, $d^{10}$. The coils $d^{11}$ would cause the vapors to follow a circuitous path around the brine tank, so as to get a thorough contact with the cooling tank, and to condense them. They would then pass thru the pipe $e^5$ into the chamber $e'$, from which they would be withdrawn thru the faucet $e^4$. Any carbonic acid gas in the alcohol would rise thru the goose-neck $a^3$, be filtered by water in the chamber $e^2$ and would be withdrawn thru pipe $e^6$.

Having thus described my invention, what I claim is:—

1. In an apparatus of the class described, the combination of a fermenting tub, an alcohol condenser, a pipe connecting the upper end of the tub to the condenser, the tub, condenser and pipe confining a closed space, a heating coil within the upper part of the tub and adapted to assume a position immediately above the fermenting substance, and a cooling coil beneath the heating coil.

2. In an apparatus of the class described, the combination of a fermenting tub, an alcohol condenser, a pipe connecting the upper end of the tub to the condenser, the tub, condenser and pipe confining a closed space, a heating coil within the upper part of the tub, a cooling coil beneath the heating coil, the condenser comprising a receiving drum, a column beneath the drum, a brine tank within the column a central pipe extending thru the bottom of the drum to a point adjacent to its top, and an alcohol receiver at the bottom of and communicating with the drum.

3. In a apparatus of the class described, the combination of a fermenting tub comprising a heating coil within the top of the tub, and adapted to assume a position immediately above the fermenting substance, a cooling coil within the tub and beneath the heating coil, and an outlet in the top of the tub.

4. A process for making beer of alcoholic content nonviolative of the National Prohibition Act comprising placing beer and yeast in a fermentating tub, permitting fermentation to proceed to an amount now violative of the National Prohibition Act, then heating the surface of the beer and cooling the body thereof and withdrawing the alcoholic vapors from above the surface of the beer.

5. A process of making beer of low alcoholic content comprising heating the surface of a beer which contains alcohol of a volume nonviolative of the National Prohibition Act, and keeping the body of the beer cool and withdrawing the alcoholic vapors from above the surface of the beer.

6. A process of making beer of low alcoholic content which comprises heating the surface of a beer which contains alcohol in a quantity nonviolative of the National Prohibition Act and thereby vaporizing the alcohol at the surface of the beer, keeping the body of the beer cool, recovering the alcoholic vapor from the immediate proximity of the body of the beer and condensing the vapor.

7. An apparatus of the class described comprising a fermenting vat having an attemperating coil arranged to be immersed in the fermenting liquid, a heating coil arranged in the space above the liquid, a delivery pipe, and means having a tendency to withdraw and condense the vapors from the fermenting vat.

8. The process comprising the steps of allowing a fermenting wort to reach a temperature of 48° F. and maintaining it at approximately that temperature, and passing the vapors and gases freed by the fermentation process through a region heated to between 80° and 125° F. into a low temperature region where they are condensed.

In testimony whereof, I have hereunto subscribed my name this 18th day of September, 1919.

HENRY E. DECKEBACH.